Figure 1:
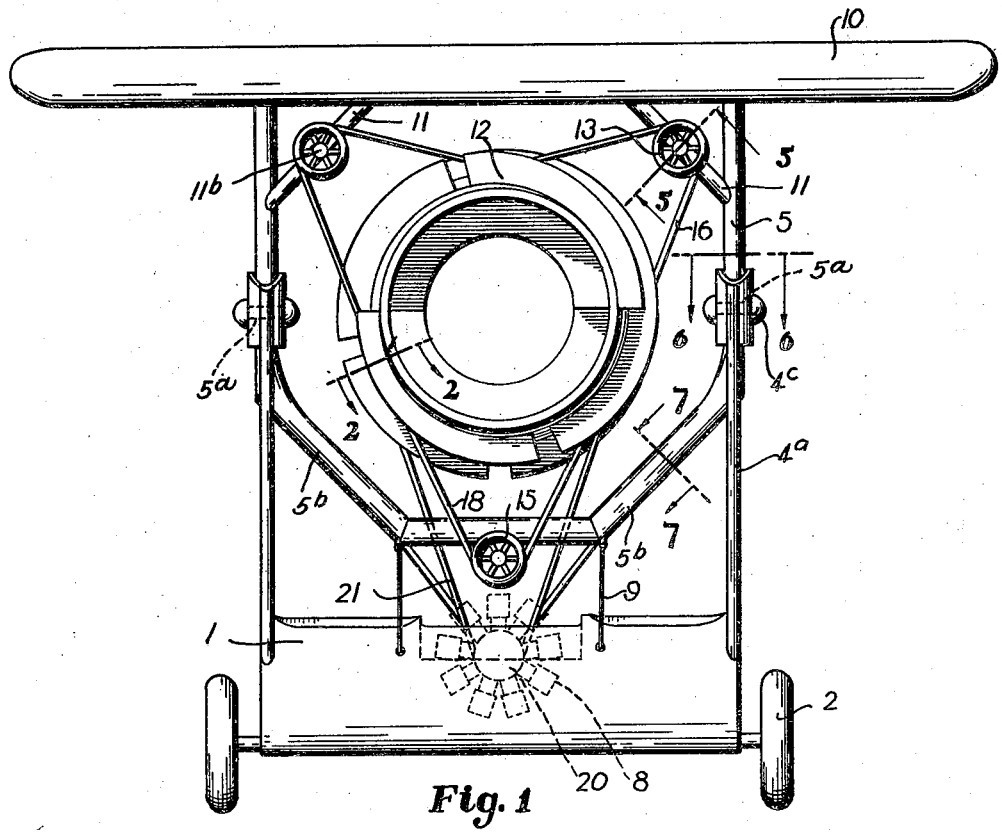

Jan. 20, 1931.   P. MAIWURM   1,789,529
SUPPORTING APPARATUS FOR AIRCRAFT PROPULSION AND SUSTAINING MEANS
Filed July 29, 1929   3 Sheets-Sheet 2

INVENTOR.
PAUL MAIWURM
BY A. B. Bowman
ATTORNEY

INVENTOR.
PAUL MAIWURM
BY A. B. Bowman
ATTORNEY.

Patented Jan. 20, 1931

1,789,529

UNITED STATES PATENT OFFICE

PAUL MAIWURM, OF SAN DIEGO, CALIFORNIA

SUPPORTING APPARATUS FOR AIRCRAFT PROPULSION AND SUSTAINING MEANS

Application filed July 29, 1929. Serial No. 381,709.

My invention relates to supporting apparatus for aircraft propulsion and sustaining means, and the objects of my invention are: First, to provide an apparatus of this class in which cables support the aircraft propulsion and sustaining means so as to reduce interference with its slip stream to a minimum; second, to provide an apparatus of this class which is especially adapted for aircraft in which a revolving tube constitutes the sustaining and propulsion means; third, to provide an apparatus of this class in which the sustaining and propulsion means may be pivoted about a horizontal axis, while said means is revolving so as to cause the aircraft to change its direction of flight; fourth, to provide an apparatus of this class in which all but the vertical portions thereof may have the cross section of a wing, thereby enabling said supporting apparatus to assist the sustaining action of a sustaining and propulsion means; fifth, to provide an apparatus of this class which has a sufficient sustaining force to permit an aircraft upon which it is mounted to glide should the propelling and sustaining means cease to function; sixth, to provide an apparatus of this class in which the wing section portions shift with the propulsion and sustaining means so as to always maintain the proper angle of attack; seventh, to provide an apparatus of this class which is especially adapted to support a fuselage at the under side of said sustaining means, thereby ensuring considerable inherent stability as the center of gravity of an aircraft will be, in such a case, considerably below the center of lift; eighth, to provide a supporting apparatus of this class in which the power plant necessary to operate a propulsion and sustaining means may be easily incorporated into said supporting apparatus so as to move therewith and thereby remain in a constant relation to said propulsion and sustaining means; ninth, to provide an apparatus of this class which has a minimum amount of parasite resistance, and tenth, to provide an apparatus of this class which is extremely simple of construction proportional to its function, durable, efficient in its action, and which will not readily deteriorate or get out of order.

Figure 2:
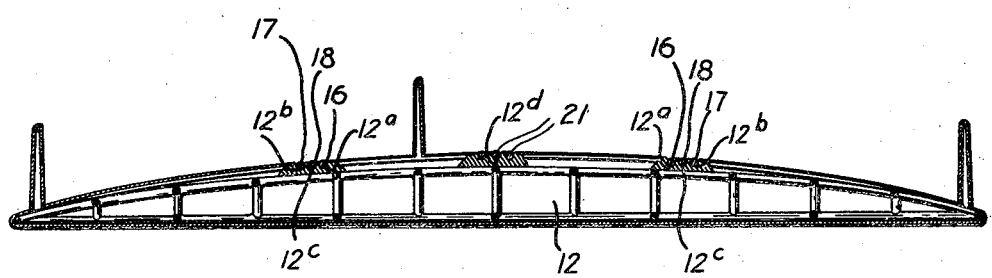
Figure 3:
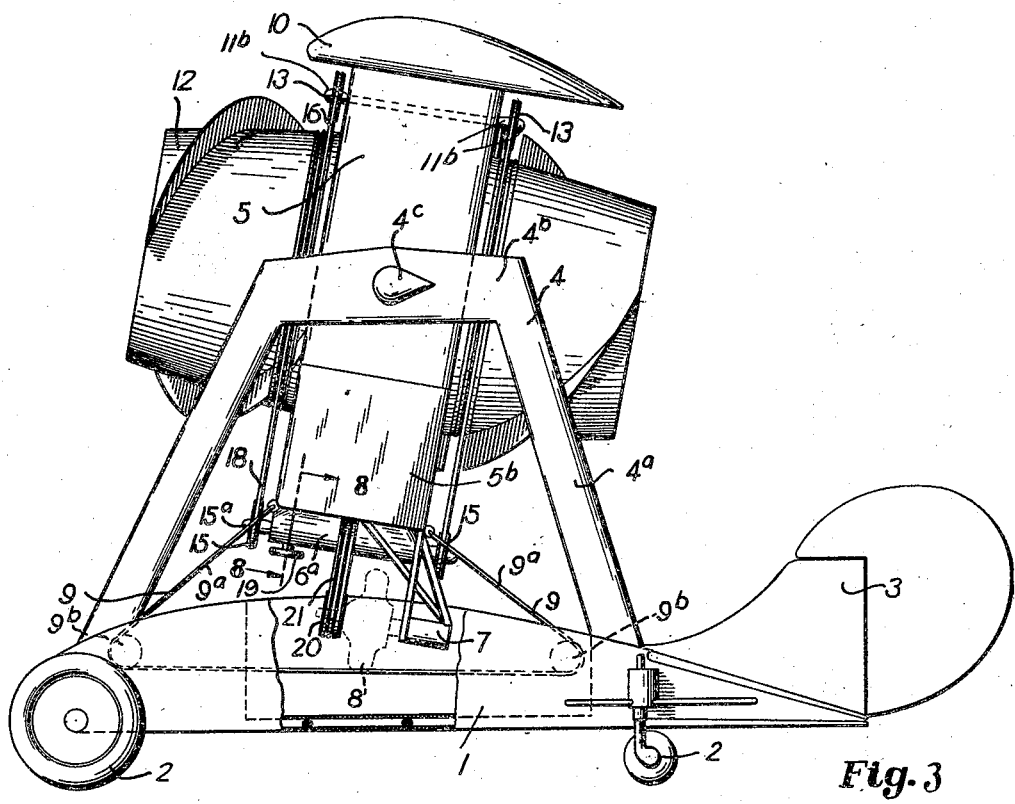
Figure 4:
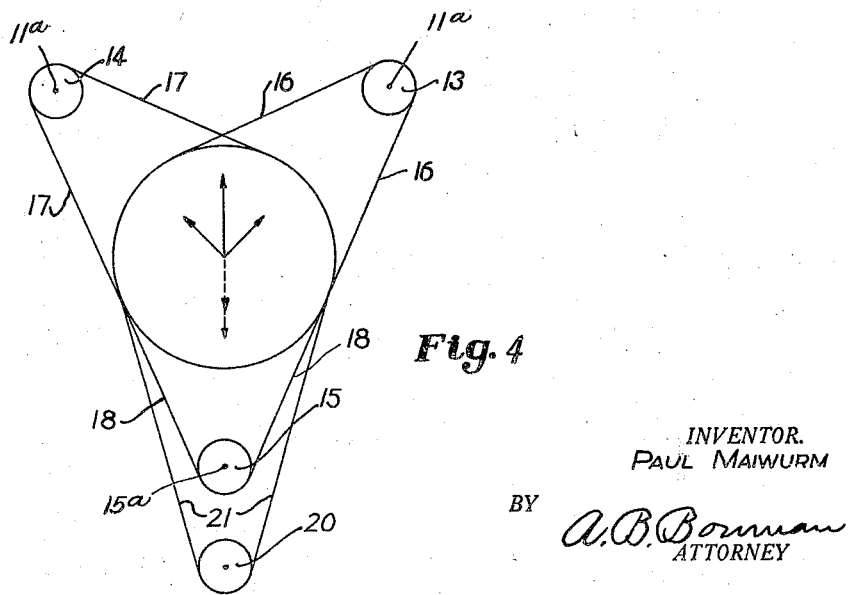
Figure 5:
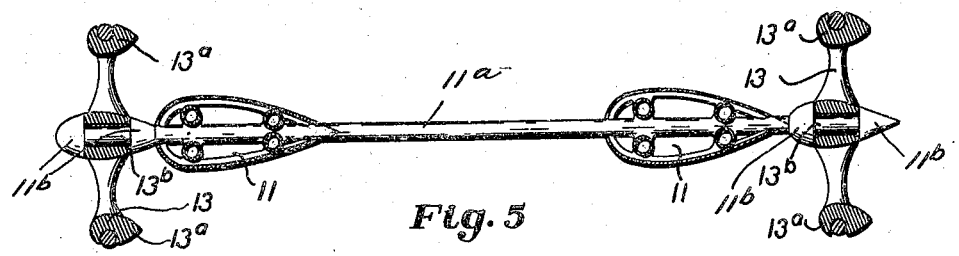
Figure 6:
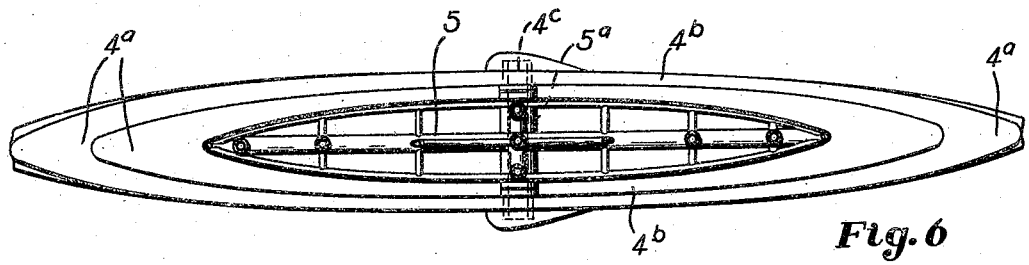
Figure 7:
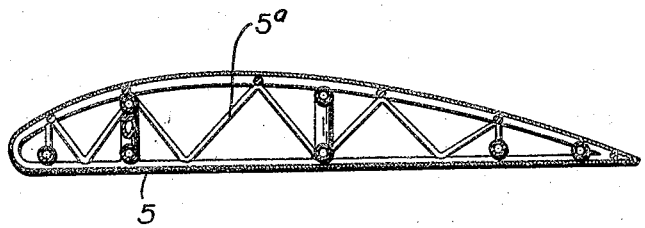
Figure 8:
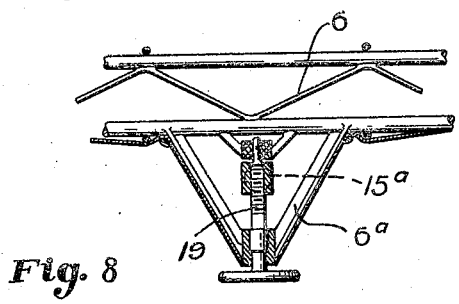

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a front elevational view of an aircraft embodying my invention; Fig. 2 is an enlarged sectional view through 2—2 of Fig. 1 showing the propulsion means and a manner of supporting the same; Fig. 3 is a side elevational view of my apparatus with parts and portions broken away and in section to facilitate the illustration; Fig. 4 is a diagrammatic view showing the method of supporting the sustaining means; Fig. 5 is an enlarged sectional view through 5—5 of Fig. 1, with parts and portions in elevation to facilitate the illustration; Fig. 6 is an enlarged sectional view through 6—6 of Fig. 1 with parts and portions shown fragmentarily to facilitate the illustration; Fig. 7 is an enlarged sectional view through 7—7 of Fig. 1, and Fig. 8 is an enlarged fragmentary sectional view through 8—8 of Fig. 3, with parts and portions in elevation to facilitate the illustration.

Similar characters of reference refer to similar parts and portions throughout the several views of the drawings.

Fuselage 1, landing gear 2, control surfaces 3, girder members 4, frame side members 5, frame base member 6, motor support 7, motor 8, shifting means 9, cross members 10, bracing 11, propelling and sustaining means 12, idler pulley sets 13, 14 and 15, idler pulley cable sets 16, 17 and 18, tension adjusting means 19, drive pulleys 20, and drive cables 21, constitute the principal parts and portions of my apparatus.

The fuselage 1 is preferably made relatively wide and is provided with suitable landing gear 2, and control surfaces 3. Extending upwardly preferably adjacent to each side margin of the fuselage are girder members 4, as shown in Figs. 1 and 3. Each of these girder members consists of two upwardly extending strut members 4a which are connected together at their extended ends by a cross member 4b. Each cross member 4b is double forming a relatively large opening extending vertically therethrough which is adapted to receive one of the frame side members 5 of the supporting apparatus.

Each frame side member 5 has the cross section of an air-foil so as to reduce wind resistance and is built up of suitable bracing and cross members as indicated in Fig. 6. A shaft 5a extends transversely through each side member 5 and into journals 4c formed in each side of the cross member 4b of the girder members 4, as shown best in Fig. 6.

The lower portion 5b of each side member 5 below the journalled portion thereof extends inwardly at an angle towards the similar portion of the other frame side member, as shown in Fig. 1. This portion has preferably the cross section of a wing, as indicated in Fig. 7, so as to assist in the sustaining of the aircraft.

Connected between these two inwardly extending portions 5b is a base member 6 which also has the cross section of a wing, as indicated in Fig. 3. Secured to the base member 6 by suitable rods and bracing is a motor support 7 upon which is mounted a motor 8 of any suitable design, as indicated by the dotted lines in Figs. 1 and 3.

Connected to the base member 6, as shown in Figs. 1 and 3, or to any other portion of the supporting apparatus, are cables 9a which pass over suitable pulleys 9b and form the means for shifting the position of the supporting apparatus 9.

The upper end of the side members 5 are connected together by a cross member 10 which when the aircraft is in its normal position extend horizontally. This cross member has the cross section of a wing and may in order to increase the wing area of the aircraft, extend past the outer sides of the upright members 5, as shown in Fig. 1. Bracing 11 extends from the upper, inner portion of each frame side member 5 to the under side of the cross member 10, as indicated in Fig. 1.

The propelling and sustaining means 12 is a substantially barrel shaped tube having fins on its inner and outer surfaces preferably positioned so as to form a helix which increases in pitch from the forward to the rear end of said tube. This structure is more fully disclosed in my Patent Number 1,743,467, dated January 14, 1930. However, any type of propulsion and sustaining means, capable of functioning when supported by my supporting apparatus, may be used.

A shaft 11a extends through each set of bracing 11 parallel with the axis of rotation of the propulsion and sustaining means 12.

Mounted at each end of the one shaft 11a is an idler pulley 13 which is preferably provided with a streamed lined rim 13a. The hub 13b of each pulley 13 together with fittings 11b on the shaft 11a preferably forms a stream lined body, as shown best in Fig. 5. The one idler pulley 13 is positioned a slight distance forward of the forward edge of the frame side members 5, while the rear pulley 13 is positioned a slight distance rearwardly of the rear side of the frame side member 5.

The other shaft 11a is provided with idler pulleys 14 similar in construction to the pulleys 13 but the plane of the cable groove in each pulley 14 is in slightly offset relation though parallel to the plane of the corresponding pulley 13, as indicated in Fig. 3.

A third set of idler pulleys 15 are mounted underneath the base member 6 in a suitable housing 6a with the planes of their grooves between those of the idler pulleys 13 and 14.

A cable 16 passes around each idler pulley 13 and around a track 12a formed in the surface of the propulsion and sustaining means 12, as shown in Fig. 2. A cable 17 passes around each pulley 14 and around a similar track 12b spaced slightly from the track 12a. A cable 18 passes around each idler pulley 15 and around a track 12c in the sustaining and propulsion means positioned between the tracks 11 and 12, as shown in Fig. 2. The distance between the planes of the idler pulleys are offset so as to be in aline with their respective grooves 12a, 12b and 12c. In order to give the best stability to the sustaining means these sets of grooves are positioned about a third of the distance from each end.

In order to maintain all of the cables taut, a tension means 19 is provided, as indicated in Fig. 8, which draws the axle 15a supporting the two pulley wheels 15 downwardly until the proper tension is provided.

The motor 8 is provided with a shaft upon which is mounted a drive pulley 20. This pulley is preferably adapted to receive a plurality of drive cables 21, as shown in Fig. 3. These drive cables fit in grooves 12d formed in the periphery of the propulsion and sustaining means, as shown in Fig. 2.

As indicated by the diagrammatical view Fig. 4, several sets of cables and their idler pulleys securely hold the sustaining means in its desired position and at the same time permit free rotation thereof. As the cables may be relatively small and consequently offer but a small resistance and the pulleys and frame work are spaced from the propulsion and sustaining means, the slip stream about the propulsion and sustaining means is not noticeably affected.

It will also be noted that as the various portions of the supporting apparatus may be easily stream lined or may be used in sustaining the aircraft, there is a minimum amount of parasite resistance. It will also be noted that the pulleys 15 instead of being idler wheels may be driving pulleys, thereby eliminating the extra weight of the driving cables 21 and driving pulleys 20.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In an apparatus of the class described, fuselage supporting girders, a frame means pivotally connected to said girders, pulleys supported by said frame, a propelling and sustaining means, and cables passed around said pulleys and around said propelling and sustaining means for supporting and rotating said propelling and sustaining means.

2. The combination with an aircraft fuselage propelling means and sustaining means, of pairs of idler pulleys supported in spaced relation to each other and to said propelling means, the one member of each pair of pulleys being opposite said propelling means near the forward portion thereof, and the other member of each pair of idler pulleys being opposite said propelling means near the rear end thereof, and a cable means passing around said idler pulleys and around said propelling means for revolubly supporting the latter relative to said pulleys.

3. The combination with an aircraft fuselage and propelling and sustaining means, of pulleys supported in spaced relation to each other and to said propelling and sustaining means, a cable passing around said pulleys and said propelling and sustaining means for supporting the latter in spaced relation to said pulleys.

4. In a device of the class described, the combination with a fuselage and aircraft propelling and sustaining means, of a plurality of pulleys arranged in spaced relation to each other and to said sustaining means, a plurality of cables each extending around one of said pulleys and around said propelling and sustaining means so as to permit only rotary motion of said propelling and sustaining means relative to said pulleys.

5. The combination with an aircraft fuselage propelling means and sustaining means, of pairs of idler pulleys supported in spaced relation to each other and to said propelling means, the one member of each pair of pulleys being opposite said propelling means, near the forward portion thereof, and the other member of each pair of idler pulleys being opposite said propelling means near the rear end thereof, a cable means passing around said idler pulleys and around said propelling and sustaining means for revolubly supporting the latter relative to said pulleys, a motor mounted in spaced relation to said propelling and sustaining means, and pulley and cable means for rotating said propelling and sustaining means with said motor.

6. The combination with an aircraft fuselage, and propelling and sustaining means, of pulleys supported in spaced relation to each other and to said propelling and sustaining means, a cable passing around each of said pulleys and said propelling and sustaining means for supporting the latter in spaced relation to said pulleys, a motor mounted in spaced relation to said propelling and sustaining means, and pulley and cable means for rotating said propelling and sustaining means with said motor.

7. In a device of the class described, the combination with a fuselage and aircraft propelling and sustaining means, of a plurality of pulleys arranged in spaced relation to each other and to said sustaining means, a plurality of cables each extending around one of said pulleys and around said propelling and sustaining means so as to permit only rotary motion of said propelling and sustaining means relative to said pulleys, a motor mounted in spaced relation to said propelling and sustaining means, and pulley and cable means for rotating said propelling and sustaining means with said motor.

8. The combination with an aircraft fuselage and propelling means and sustaining means, of pairs of idler pulleys supported in spaced relation to each other and to said propelling means, the one member of each pair of pulleys being opposite said propelling means near the forward portion thereof, and the other member of each pair of idler pulleys being opposite said propelling means near the rear end thereof, a cable means passing around said idler pulleys and around said propelling means for revolubly supporting the latter relative to said pulleys, frame means common to all of said pulleys, said frame means pivotally connected with said fuselage.

9. The combination with an aircraft fuselage and propelling and sustaining means, of pulleys supported in spaced relation to each other and to said propelling and sustaining means, a cable passing around said pulleys and said propelling and sustaining means for supporting the latter in spaced relation to said pulleys, and frame means common to all of said pulleys, said frame means pivotally connected with said fuselage.

10. The combination with an aircraft fuselage, propelling means, and sustaining means, of pairs of idler pulleys supported in spaced relation to each other and to said propelling means, the one member of each pair of pulleys being opposite said propelling means near the forward portion thereof, and the other member of each pair of idler pulleys being opposite said propelling means near the rear end thereof, and a cable means passing around said idler pulleys and around said propelling means for revolubly supporting the latter relative to said pulleys, a motor mounted in spaced relation to said propelling means, pulley and cable means for rotating said propelling means with said motor, and frame means common to all of said pulleys, said frame means pivotally connected with said fuselage.

11. The combination with an aircraft fuselage and propelling and sustaining means, of pulleys supported in spaced relation to each other and to said propelling and sustaining means, a cable passing around said pulleys and said propelling and sustaining means for supporting said sustaining means in spaced relation to said pulleys, a motor mounted in spaced relation to said propelling and sustaining means, pulley and cable means for rotating said propelling and sustaining means with said motor, and frame means common to all of said pulleys, said frame means pivotally connected with said fuselage.

12. The combination with an aircraft fuselage and propelling and sustaining means, of pairs of idler pulleys supported in spaced relation to each other and to said propelling and sustaining means, the one member of each pair of pulleys being opposite said propelling and sustaining means near the forward portion thereof, and the other member of each pair of idler pulleys being opposite said propelling and sustaining means near the rear end thereof, and a cable means passing around said idler pulleys and around said propelling and sustaining means for revolubly supporting the latter relative to said pulleys, frame means common to all of said pulleys, said frame means pivotally connected with said fuselage, portions of said frame having the cross section of a wing so as to assist the sustaining action of said propelling and sustaining means.

13. The combination with an aircraft fuselage and propelling and sustaining means, of pulleys supported in spaced relation to each other and to said propelling and sustaining means, a cable passing around said pulleys and said propelling and sustaining means for supporting said sustaining means in spaced relation to aid pulleys, a motor mounted in spaced relation to said propelling and sustaining means, pulley and cable means for rotating said propelling and sustaining means with said motor, frame means common to all of said pulleys, said frame means pivotally and controllably connected with said fuselage, portions of said frame having the cross section of a wing so as to assist the sustaining action of said propelling and sustaining means.

14. In a device of the class described, the combination with a fuselage and aircraft propelling and sustaining means, of a plurality of pulleys arranged in spaced relation to each other and to said sustaining means, a plurality of cables each extending around one of said pulleys and around said propelling and sustaining means so as to permit only rotary motion of said propelling and sustaining means relative to said pulleys, a motor mounted in spaced relation for rotating said propelling and sustaining means with said motor, a frame means for supporting each of said pulleys and said motor, said frame means pivotally connected to said fuselage so as to permit pivotal movement of said propelling and sustaining means relative to said fuselage.

In testimony whereof, I have hereunto set my hand at San Diego, California this 19th day of July, 1929.

PAUL MAIWURM.